Dec. 18, 1951  A. D. GOLDMAN  2,578,694
GENERATOR TESTER
Filed Jan. 14, 1950  2 SHEETS—SHEET 1
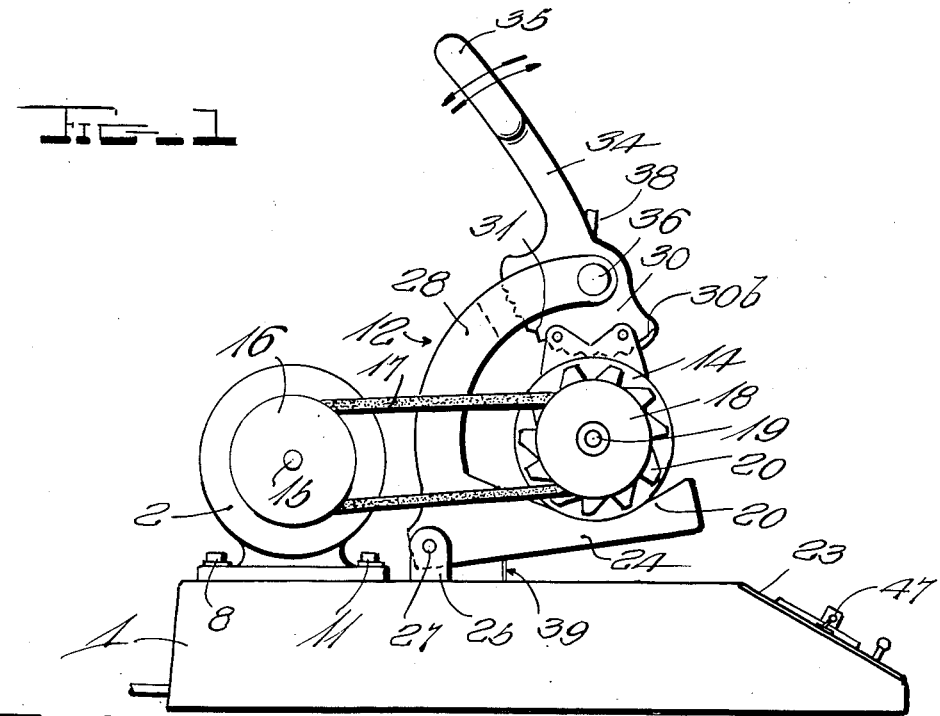
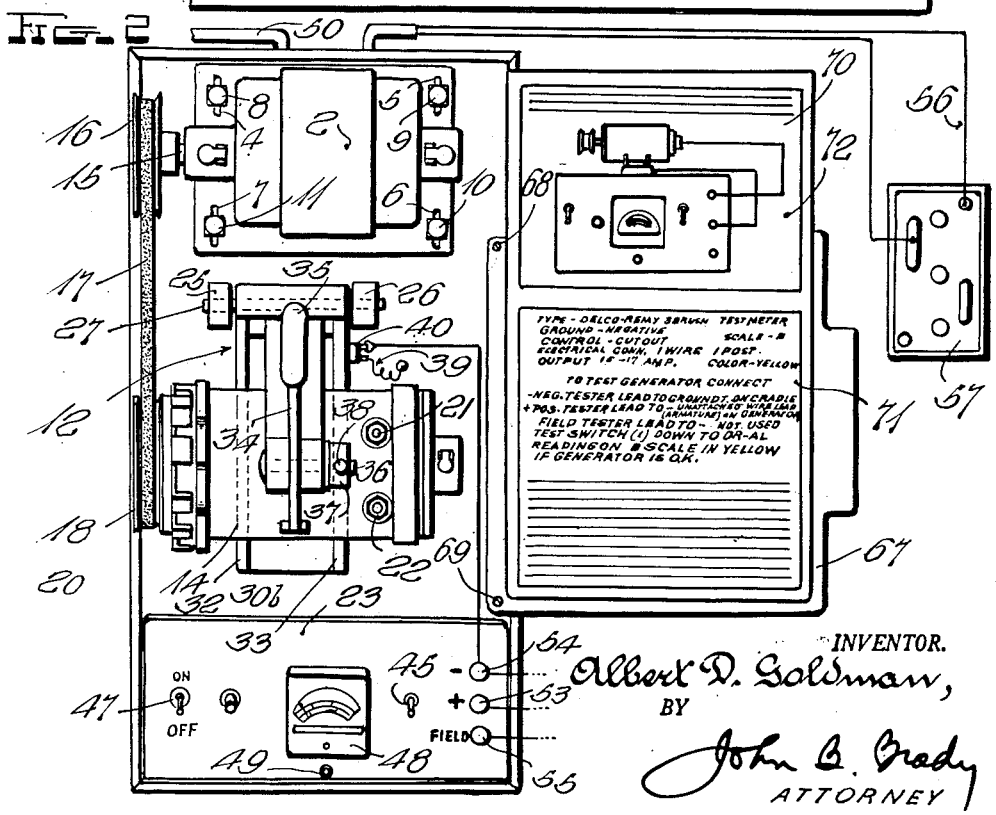
INVENTOR.
Albert D. Goldman,
BY
John B. Brady
ATTORNEY Dec. 18, 1951     A. D. GOLDMAN     2,578,694
GENERATOR TESTER
Filed Jan. 14, 1950     2 SHEETS—SHEET 2
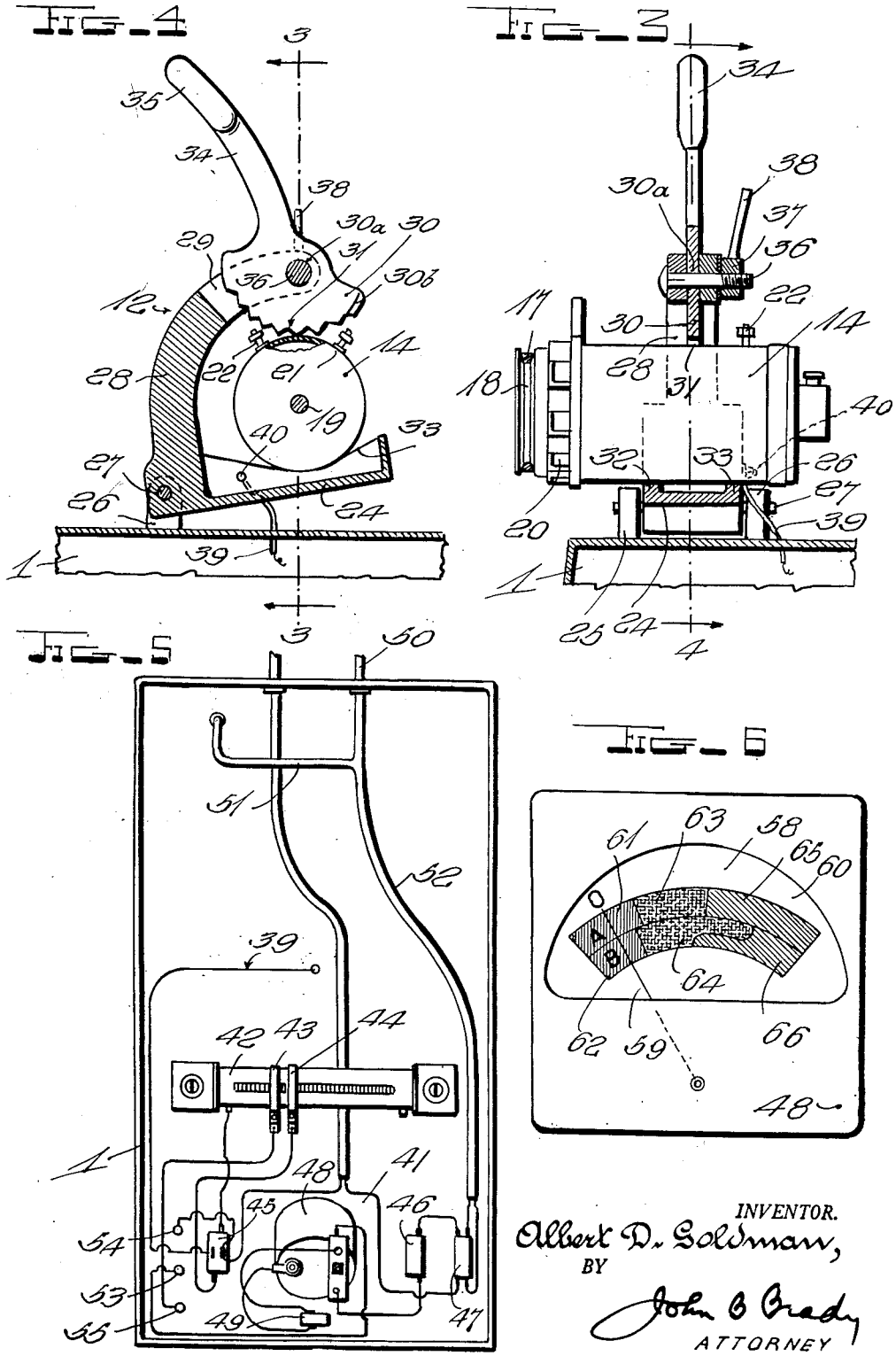
INVENTOR.
Albert D. Goldman,
BY
John B Brady
ATTORNEY Patented Dec. 18, 1951

2,578,694

UNITED STATES PATENT OFFICE 2,578,694

GENERATOR TESTER

Albert D. Goldman, Baltimore, Md.

Application January 14, 1950, Serial No. 138,561

8 Claims. (Cl. 171—252)

My invention relates broadly to equipment for automotive and kindred electrical service stations and sales outlets, and more particularly to a testing apparatus for internal combustion electrical system generators.

One of the objects of my invention is to provide a testing equipment for quickly determining whether or not an electrical generator is producing current according to its stated output or capacity.

Another object of my invention is to provide portable means for rapidly checking the operating characteristics of generators for internal combustion electrical systems.

Still another object of my invention is to provide a construction of portable test bench for mounting and testing electrical system generators in a service station.

A still further object of my invention is to provide a construction of clamping rig for detachably mounting an electrical generator and driving the generator while electrically measuring output of the generator.

Still another object of my invention is to provide a construction of readily portable test bench for service stations in which all types of generators for electrical systems in different makes of equipments may be rapidly tested, the test bench including index means for facilitating the testing of a generator from any particular electrical system out of a wide range of types of generators utilized in electrical circuits of various makes of equipments.

Other and further objects of my invention reside in a practical arrangement for mounting and driving an electrical generator of general application, to be tested, and making electrical measurements thereon, as set forth more fully in the specification hereinafter following, by reference to the accompanying drawings, in which:

Figure 1 is a side elevational view of the portable test bench of my invention, showing a generator in position thereon and being driven by the motor of the test bench while electrical measurements are being made with respect to the electrical output of the generator; Fig. 2 is a top plan view of the test bench shown in Fig. 1, illustrating a generator on test, and showing particularly the index means by which the test to be applied to a wide variety of different types of generators may be readily determined by the service man performing the tests; Fig. 3 is a fragmentary vertical sectional view taken through the means for clamping the generator on the test bench, the view being taken substantially on line 3—3 of Fig. 4; Fig. 4 is a fragmentary vertical sectional view taken substantially on line 4—4 of Fig. 3, and showing a generator clamped in position on the test bench; Fig. 5 is a view taken beneath the base of the test bench showing the circuit elements of the test system; and Fig. 6 is an enlarged front elevational view of the indicating meter for rapidly determining the electrical characteristics of the generator and indicating whether or not the generator meets normal requirements for satisfactory operation in the electrical system of an automobile.

My invention provides a very practical and convenient portable unit for automotive and kindred electrical service stations for enabling the service men to make rapid tests on the generator for electrical systems in aviation, marine, stationary truck, tractor and automobile installations for determining the electrical condition of the generator. There are many conditions of failure of electrical systems in various equipments which appear baffling in their solutions for lack of proper facilities to test the electrical generator for output. The test bench of my invention provides clamping means for mounting generators of a wide variety of shapes and sizes found in the many different makes of equipments, and electrically connecting the output of the generator into an electrical measuring circuit and driving the generator in a manner simulating normal operating conditions prevailing in the intended installation, for rapidly indicating to the service man the condition of the generator. The wide variety of different types of generators found in electrical circuit of different makes of installations has heretofore rendered it extremely difficult to test such generators. My invention, however, provides a universal test bench operative to test all makes of generators found in a wide variety of different makes of equipments. The generator, when removed from the circuit, is first checked as to make, and reference made by the service man to a catalog index conveniently mounted directly upon the test bench. The catalog index contains the pertinent classified information incident to all types of generators to be found in different makes of equipments which may be normally expected to be found in operation. The service man, by referring to the catalog index, is informed as to the normal characteristics of the generator, and what is to be expected from the electrical measurement to be performed on the test bench. Failure of the generator, when driven by an electrical motor installed on the test bench, to respond to the normal requirements indicated by the catalog index, gives the service man an immediate indication as to the source of the trouble in the electrical system. The generator may accordingly be repaired or replaced, in correcting the electrical system.

The testing apparatus of my invention is unique in that it makes the required determinations with consumption of very little power, that is with as low as a ⅓ H. P. motor instead of up to 6 H. P. that has heretofore been required.

Its simplicity of operation makes its operation by untrained personnel possible, such as countermen in automotive jobber establishments, or sales personnel in retail outlets, along with gasoline station service station personnel—none of the above groups generally having automotive electrical training such as is needed to operate the conventional testing equipment heretofore available.

In my experimentation, to develop a quick simplified method of testing generators that is so necessary for sales and service I have found conventional methods impracticable for use by untrained or even semi-trained personnel; I have found it necessary to develop an electrical circuit and a combination of switches so as to get a constant output that is in fact based on the potential output of the generator.

Explanation as to how I finally obtained the proper results is as follows:

By decreasing the resistance path at the output end of the generating circuit, less power is required because of the decrease in the wattage output. From this point on, I found that while I could use a smaller motor, I could not secure a constant output so as to determine the real potential charging rate of the generator. After many experiments, trials, and errors, I developed a circuit that operates as follows: by using a four pole switch on a driving motor, I may turn the motor on and at the same time pass current through the generator.

While the generator is working, the current value because of the low resistance is not adequate to energize the generator sufficiently to get the total potential of its output. To overcome this, I found that by breaking the circuit, through a normally closed push button switch, the residual magnetism inherent in the generator core and field poles might be built up so as to increase the saturation of the magnetic flux. By then operating a meter protecting push button switch, a meter circuit is closed to secure a meter reading which denotes the output of the generator. This method for the testing of generating equipment is believed to be highly novel. By use of the arrangement of my invention, I secure a proportionate amount of output that determines the condition of the generator. A very necessary adjunct of this testing equipment is the use of the protective switch for the meter. This method protects the meter from abuse or wear when being constantly used or by being short-circuited causing damage to the meter which might be to the extent of the burning out of the coil, or by bending the hand, which would affect, in either case, the true reading.

This testing equipment, too, has an advantage because the low resistant values in the circuit helps to determine immediately any weak points such as bad contacts, due to loose connections, improper seating of brushes, improperly soldered connections, or loose connections due to screws not being tight where terminals are attached. This has been found to be a substantial asset in determining immediately any latent weak points which might not normally show up immediately, in the way of a defect under normal operating conditions, but which developed at a later date during the stresses and strains of actual service.

Another feature of the development is the use of the mounting and holding methods. This feature permits a quick and easy mechanical method of holding the generator in its proper position in relation to the pulley alignment. The generator is held securely through a cam fastening arrangement with a locking device. This complete holding device operates in a manner that permits the proper tensioning of the belt so as to eliminate slippage. This is done by mounting the generator on the opposite end of a pivoted cradle from its pivot point and by lifting the generator to that position of an arc so as to place the belt on both the motor pulley and the generator pulley. Then by releasing the hold on the generator mounted in the cradle, the weight of the generator automatically, as it moves downward on its arc, has sufficient weight for proper tensioning of the belt.

Another feature of my invention is the use of descriptive matter pertaining to various types of generators to be tested. This consists of illustrated cards showing the methods of properly attaching wires to the specific generator to be tested.

Another feature of my invention is the simplicity of the wiring arrangement used for attaching the generator to be tested. Instead of having a great many wires, this equipment makes it possible to test all the popular generators with the use of only three wires. Internal circuit within the tester takes care of other wiring usually necessary for testing purposes to determine the output of the generator.

Another feature of my invention is a meter that incorporates a color scheme to determine the output. This makes it possible to take care of generators that have been adjusted for various outputs and permits the maximum minimum reading within a particular color band.

The use of color areas on the meter scale does away with the time consuming practice used in showing values with numbers. This is important for the purpose for which this tester is used—for quickly determining at the time of sale whether or not the generator delivers its specified output.

The test bench of my invention is applicable to both two and three brush generators, and includes adjustable circuit elements which may simulate the regulation obtainable in various types of electrical circuits.

I have found the test bench of my invention highly practical and useful under service conditions, in discovering faults in ignition circuits of a wide variety of ignition systems found in different makes of automobiles, and while I have described my invention herein in certain of its preferred embodiments, I desire that the form of my invention disclosed be considered in the illustrative sense and not in the limiting sense.

Referring to the drawings in detail, reference character 1 designates the base of the test bench, which is of substantial depth and is hollow to provide mounting space for the circuit components and for the forward projection of the measuring instrument control switches and terminals from the meter panel of the test bench. The test bench 1 provides mounting means at the rear of the top thereof for the driving motor 2, which is supported on a plate 3 provided with slots 4, 5, 6 and 7, through which securing bols 8, 9, 10 and 11 project and are adjustable for securing the motor 2 in a proper driving position with respect to the clamping means 12 for the generator 14 under test. The driving motor 2 drives shaft 15, carrying pulley 16 around which the V-belt 17 is looped for engagement with the pulley 18 on the shaft 19 of the generator 14.

The generator 14 which is being tested is shown as including cooling fan 20, and conventional terminals 21 and 22 projecting from the casing thereof. The terminals 21 and 22 provide means for establishing connection through spring clips carried by flexible leads extending through the instrument panel 23 of the test bench.

The clamp 12 consists of a pivotally mounted plate 24, which is pivoted at the end thereof adjacent the driving motor 2 in lugs 25 and 26, which extend upwardly from the base 1. Pivot member 27 passes through upwardly extending lugs 25 and 26 and through the pivotally mounted plate 24 for securing the plate 24 in rockable position. The plate 24 has integrally connected therewith the upwardly extending frame member 28, which is bifurcated at its extremity, as represented at 29, for the passage of the flat cam-like member 30. The flat cam-like member 30 has a serrated edge 31 thereon for facilitating the gripping of the casing of the generator 14 when the generator 14 is resting in the substantially V-shaped rails 32 and 33 of the plate 24. The cam-like member 30 has an integrally connected lever 34 connected therewith terminating in a handgrip 35 which provides a sufficient counterbalancing weight to normally gravitationally elevate said cam-like member 30 substantially above the frame member 28 and out of an obstructive position, for entry or removal of the generator on the test bench. Cam-like member 30 is apertured at 30a for the passage of the bolt member 36 around which lever 34 pivots. Bolt member 36 is ribbed adjacent its head to fit firmly in one of the bifurcated parts of frame 28, but extends loosely through the other bifurcated part of frame 28, and is screw-threaded on the end thereof for engagement by the locknut 37. The cam-like member 30 has a pair of abutment members 30b formed integrally therewith, and these serve to limit further movement of the lever 34 in a clockwise direction when the abutment members contact the under side of frame 28 adjacent the bifurcated portion 29 thereof. The abutment members 30b maintain the handgrip 35 in a position ready to be grasped by the service man and rotated counterclockwise for gripping a generator between rails 32 and 33 and serrated edge 31 of cam-like member 30. The eccentric mounting of the cam-like member 30 on the pivot 36 enables the serrated edge 31 to be moved to an increasingly effective clamping position for gripping generators of different sizes. Locknut 37 has a lever 38 extending therefrom which enables the cam-like member 30 to be clamped in its adjusted position when moved to clamping engagement with the casing of generator 14, as represented in Figs. 1–4. When the test generator is to be removed, lever 38 is revolved to retract locknut 37 from the screw threads on bolt 36, thereby enabling the bifurcated end of frame 29 to spread sufficiently to allow cam-like member 30 to be swung out of obstructing position to enable the removal or entry of a test generator with respect to the clamp. The cam-like member 30 is so shaped that a clamping grip may be established between the frame 28 and the casing 14 of the generator, for a wide variety of sizes and diameters of generators to be tested.

By reason of the pivotal mounting of plate 24 and frame 28 on pivot 27, the generator is free to move in an orbit with respect to the driving motor 2, so that belt 17 may thus be stretched taut under the gravitational influence of the mass of the generator 14 and the clamping frame. Thus, the driving of the generator 14 under conditions simulating the operating conditions of the automobile in transit, may be produced.

The frame of the generator 14 rests directly upon rails 32 and 33 of rockable plate 24, and this rockable plate 24 is connected through a flexible lead, which I have indicated at 39, bonded to the plate 24 by post 40. Lead 39 thus automatically provides a grounded connection to the frame of the generator 14, simulating the grounded connection through the automobile chassis. This grounded connection 39 extends beneath the hollow base, to the circuit elements which I have indicated generally in Fig. 5 at 41 beneath the instrument panel 23. The circuit elements mounted beneath the base 1 have been illustrated schematically in Fig. 5, and include the potentiometer represented at 42 having adjustable taps 43 and 44 thereon, the manually controlled switches 45, 46 and 47, the ammeter 48 and the push button control switch for the ammeter shown at 49. The cable 50 extends to a standard source of 110 volts 60 cycles alternating current for driving the motor 2 through extension lead 51 from control lead 52 leading to the on and off switch 47. The flexible connections leading to the positive and negative side of the generator terminals 21 and 22 extend out of the instrument panel 23, as represented at 53 and 54. The flexible lead leading to the field of the generator extends out of the instrument panel at 55.

Excitation for the field of the generator 14 is supplied through cable 56 connected to a two volt cell of the storage battery 57 for thus simulating operating conditions on the automobile. By pushing switch button 49, ammeter 48 is connected in the generator circuit and an indication is given on meter scale 58 of the characteristics of the generator. As represented in Fig. 6, the indicating needle 59 of meter 58 is operative over a scale 60 which is precalibrated in various colored areas over two ranges, that is, the red area 61 in the upper scale and the red area 62 in the lower scale; the yellow area 63 in the upper scale and the yellow area 64 in the lower scale; the green area 65 in the upper scale and the green area 66 in the lower scale. I designate these scales A and B, as shown, and coordinate the calibration thus applied to the cataloged calibrated data carried by the visual index mounted on plate 67 attached at 68 and 69 to the top of base 1.

The plate 67 carries a visual index represented generally at 70, which includes card data and a circuit diagram for each make of generator generally to be found in automobile ignition systems. On the index sheet shown there is depicted the circuit diagram for the testing of a generator of the Delco-Remy—3 brush type, on which all of the pertinent test data is collected on card 71, while the test diagram for testing the generator is shown on card 72. On card 72, for example, it is shown that the positive lead extending from terminal 53 must be connected to the positive terminal of the test generator, whereas the negative lead extending from connection 54 must be connected to the grounded frame of the generator. The diagram indicates that for an appropriate condition of the generator, indicator needle 59 should move to the yellow areas 63 and 64 of the meter scale. The pertinent data collected on card 71 for this particular generator reads, for example, as follows:

TYPE—DELCO REMY—3 Brush
GROUND—Negative
CONTROL—Cutout
ELECTRICAL CONNECTIONS—1 Wire
OUTPUT—15-17 Amperes
TEST METER
SCALE—A
COLOR—Yellow

TO TEST GENERATOR CONNECT

—NEGATIVE TESTER LEAD TO—Ground terminal on cradle
+POSITIVE TESTER LEAD TO—Unattached wire lead (Armature) on generator
FIELD TESTER LEAD TO—NOT USED
TEST SWITCH (1) Down to DR-AL
READING ON A SCALE IN YELLOW IF GENERATOR IS O. K.

Similarly, data is provided in the card index for other types of ignition generators; for example, generators distinguished from the generator depicted on card 71 and 72 merely by rating of current output; generators designated, for example, as Ford—3 brush and distinguished by current output; generators designated as Autolite—2 brush of various current outputs, or further distinguished as 3 brush and 2 brush, etc.

By removing a generator from an automobile and placing it quickly on the test bench of my invention, circuits may be completed to the meter circuit and the generator then driven at a rate of speed simulating the normal operating speed in the automobile, whereupon the service man may very quickly determine whether or not the performance indicated by the generator comes up to the standard obtained by comparing the reading obtained within the standard characteristics for a generator as cataloged in the index associated with the equipment.

Wherever in the specification I have referred to the generator on test as an ignition generator for automobiles I desire that it be understood that this reference is intended to include any type of electrical generator for any type of equipment such as aviation, marine, stationary, truck, tractor, mobile warfare units as well as automotive applications and that the testing equipment of my invention has general application for testing electrical generators having a wide variety of applications.

I have found the equipment of my invention highly successful in use, and while I have described my invention in one of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A generator tester comprising a base structure, a carrier member pivotally mounted on said base structure, said carrier member including a pair of longitudinally extending rails, a frame member extending vertically from said carrier member and terminating in a position over the said rails and bifurcated at the extremity thereof, a cam shaped member pivotally mounted in the bifurcated end of said frame member, a hand lever extending from said cam shaped member and movable to positions for controlling said cam shaped member with respect to said frame member for clamping a generator having a belt driving connection thereon carried by said rails with respect to said frame, and a belt engaging the belt driving connection on said generator for driving said generator, the mass of said generator operating as a turning moment for tensioning the driving belt with the carrier member for said generator suspended in an inclined position about the pivotal connection with said base.

2. Test apparatus for generators comprising a portable base structure, a frame pivotally mounted on said base structure, said frame including a substantially open vise-like portion for mounting a test generator of the type having a belt drive thereon, and means for clamping a test generator with the belt drive thereof engaged by a driving belt having an effective length sufficient to maintain the drive to said generator under tension by the mass of said generator in said pivotally mounted frame.

3. Test apparatus comprising a base structure, a frame pivotally mounted on said base structure for receiving a generator requiring test, and means for clamping a test generator of the type having a belt drive means thereon in said frame in a position in which a driving belt looped around the drive means on said generator is maintained in driving tension under the mass of said generator.

4. Apparatus for testing generators comprising a base structure, a generator receiving frame pivotally mounted on said base structure and including a pair of longitudinally extending spaced rails and having transverse recesses therein for receiving a generator requiring test, means for clamping a generator in said generator receiving frame, the generator having belt drive means thereon, and a driving belt looped around the belt drive means on said generator for supporting said generator receiving frame in an angularly inclined position about the pivot thereof whereby the belt drive means is maintained under tension by the mass of the generator clamped in said frame.

5. Apparatus for testing generators comprising a base, a generator receiving frame open at the front thereof for receiving a generator requiring test and terminating in pivotal mounting means along an axis spaced from, but substantially parallel to one side of said base, and means for clamping a generator under test in said pivotally mounted generator receiving frame, said generator having belt driving means thereon, whereby a belt looped around the belt driving means serves to maintain said generator receiving frame in elevated position with the pivotal mounting means of said frame as a center, for thereby tensioning the driving belt while said generator is being operated.

6. Apparatus for testing generators comprising a base, a generator receiving frame open at the front thereof for receiving a generator requiring test and terminating in pivotal mounting means along an axis spaced from, and parallel to one side of said base and a serrated cam member eccentrically and pivotally mounted in said generator receiving frame and orientatable to a position for detachably clamping the generator to be tested within said generator receiving frame.

7. Apparatus for testing generators comprising a base, a generator receiving frame open at the front thereof for receiving a generator requiring test and terminating in pivotal mounting means along an axis substantially parallel to one side of said base, said generator receiving frame having a bifurcated extremity, a cam member eccentrically and pivotally mounted in said bifurcated extremity, a manually operated lever integrally connected with said cam for angularly moving said cam through the bifurcated portion of said generator receiving frame for clamping the generator under test in said frame, and means for locking the cam in engaged position against the generator under test.

8. Test apparatus for electrical generators comprising a substantially hollow base containing electrical test equipment, a generator receiving frame pivotally mounted on said base on an axis substantially parallel to one side thereof, said generator receiving frame including a recessed portion for receiving the test generator, and an upwardly extending portion projecting above the test generator, a flexible cable electrically connected with said generator receiving frame and establishing electrical connection with the test equipment within said base structure for all angular displacements of said frame, and means carried by the upwardly extending portion of said frame for clamping the generator under test in said frame, the said generator having belt drive means thereon whereby a belt looped around the belt drive means on said generator, is maintained under tension by the mass of said generator while a continuous electrical circuit is maintained between said frame and the electrical test equipment in said base for all positions of angular displacement of said frame through said flexible cable connection.

ALBERT D. GOLDMAN.

REFERENCES CITED

The following references are of record in the file of this patent:

UNITED STATES PATENTS

| Number | Name | Date |
| --- | --- | --- |
| 602,182 | Preston et al. | Apr. 12, 1898 |
| 1,413,158 | Caple | Apr. 18, 1922 |
| 2,366,889 | Westberg et al. | Jan. 9, 1945 |